March 31, 1925.

Re. 16,033

A. E. RHOADES

FEELER MECHANISM FOR LOOMS

Original Filed May 25, 1923 2 Sheets-Sheet 1

INVENTOR:
Alonzo E. Rhoades
BY Robert Harris
ATTORNEY

March 31, 1925. Re. 16,033

A. E. RHOADES

FEELER MECHANISM FOR LOOMS

Original Filed May 25, 1923 2 Sheets-Sheet 2

INVENTOR:
Alonzo E. Rhoades
BY Robert S. Haines
ATTORNEY

Reissued Mar. 31, 1925.

Re. 16,033

UNITED STATES PATENT OFFICE.

ALONZO E. RHOADES, OF HOPEDALE, MASSACHUSETTS, ASSIGNOR TO DRAPER CORPORATION, OF HOPEDALE, MASSACHUSETTS, A CORPORATION OF MAINE.

FEELER MECHANISM FOR LOOMS.

Original No. 1,507,123, dated September 2, 1924, Serial No. 641,480, filed May 25, 1923. Application for reissue filed February 13, 1925. Serial No. 8,983.

*To all whom it may concern:*

Be it known that I, ALONZO E. RHOADES, a citizen of the United States, residing at Hopedale, in the county of Worcester and State of Massachusetts, have invented an Improvement in Feeler Mechanisms for Looms, of which the following description, in connection with the drawings, is a specification, like characters on the drawings representing like parts.

This invention relates to feeler mechanisms for looms, whereby the filling is replenished from time to time prior to complete exhaustion.

Various kinds of feeler mechanisms have heretofore been suggested for the purpose of either stopping the loom or replenishing the filling when the filling in the shuttle has reached a degree of substantial exhaustion.

It is now the common practice to provide the feeler mechanism with a feeler which enters the shuttle on each detecting beat and contacts with the filling, and when the filling has reached substantial exhaustion the feeler has detected the fact and has set in operation a train of mechanism for replenishing the filling. This constantly recurring contact of the feeler with the filling on each detecting beat is liable to injure the filling, especially where the filling is of fine count or formed of material such as silk or the like. Since the function of the feeler is to call for a change of filling when that in the shuttle has become substantially exhausted, it is sufficient if the feeler performs its feeling function when the filling has approached the danger point, and initiates replenishment of filling when that in the shuttle has become substantially exhausted.

One of the objects of the present invention, therefore, is to provide a feeler mechanism for looms wherein the feeler may have short periods of activity and longer periods of inactivity during the weaving operation with the same supply of filling in the shuttle, and when in inactive or inoperative position the feeler shall be withdrawn or moved frontwardly to an extent that avoids contact with the filling on a detecting beat.

An important feature of the present invention, therefore, consists of the mechanism for withdrawing or moving the feeler away from its feeling position to render it inactive, and to hold it in such withdrawn position during its period of inactivity.

Another important feature of the present invention consists in the means for releasing the feeler from its inoperative position at intervals that it may move to feeling position and detect the condition of the filling in the shuttle, and then withdraw it from such feeling position provided a working supply of filling is detected by the feeler, or permit it to remain in active position in case the feeler detects a near approach to substantial exhaustion, so that on the occurrence of the substantial exhaustion of the filling in the shuttle the feeler may call for a change of filling.

The various novel features of the invention and new combination of parts will best be made clear from the following description and the accompanying drawings of one good practical form thereof, it being understood that the details of mechanism may be varied within the true scope of the invention as defined by the claims.

Figure 1:
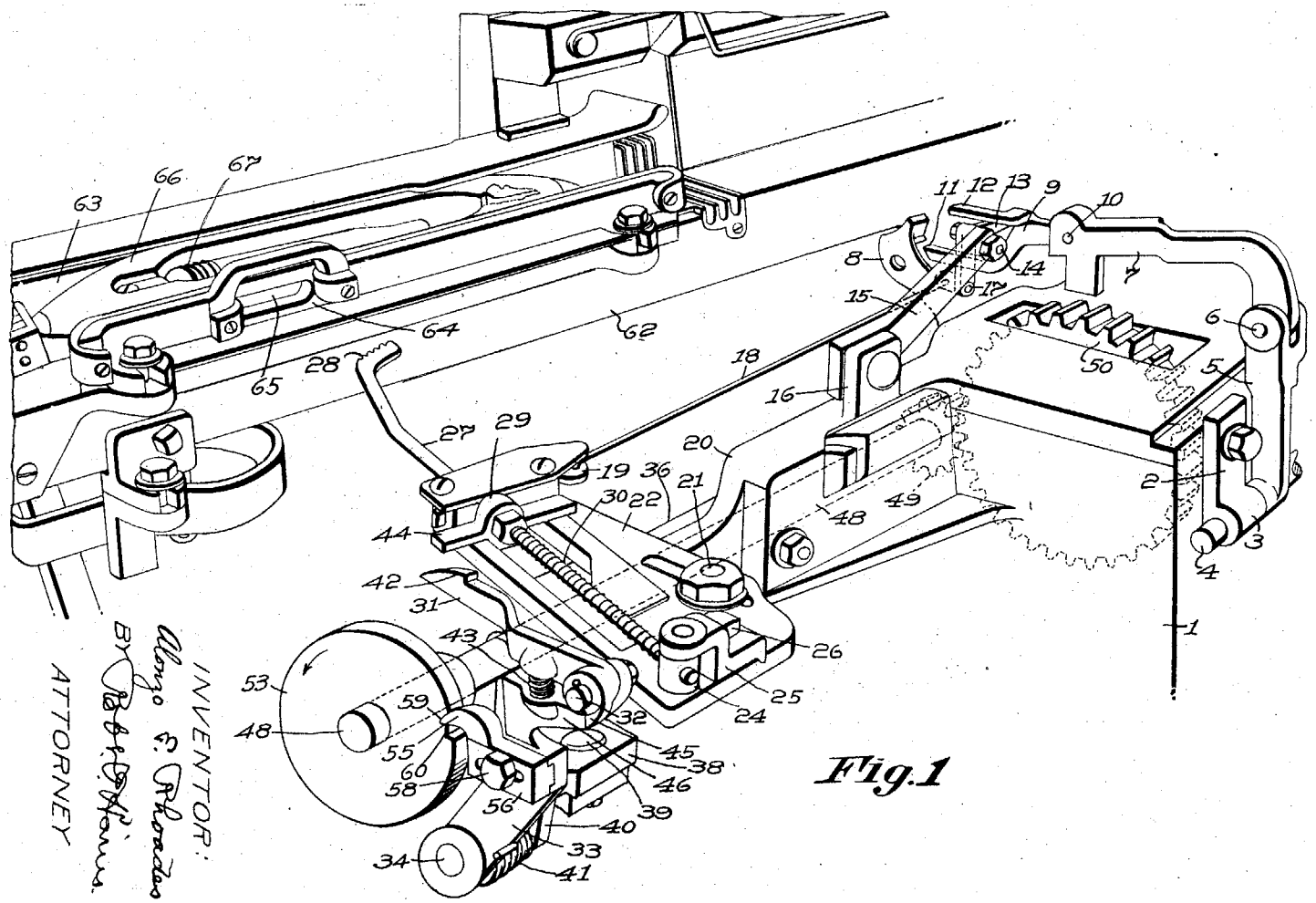
Fig. 1 is a perspective view of portions of the loom at the feeler side thereof, provided with the present invention, some of the parts being omitted for clearness of illustration.

The advantages of the present invention are well manifested in a feeler mechanism wherein the feeler is of the inclined type and will be described in connection therewith, but the present invention is not restricted to use in connection therewith, but may be advantageously employed in connection with any of the usual types of feeler mechanisms.

The details of the filling replenishing mechanism may be of usual construction, but as such details form no essential part of the present invention they are not herein illustrated and described except in so far as the train of mechanism is controlled by the feeler.

The loom frame 1 is of usual construction and secured to each side thereof are the brackets 2 having bearings 3 for the usual transverse or rock shaft 4. Secured to and extending upwardly from the rock shaft 4 is an arm 5 having pivoted thereto at 6 the rearwardly extending arm 7, the rear end portion of which is adapted to be engaged by an operating member 8 and be moved frontwardly thereby when the feeler calls for a change of filling. In the present instance, the rearwardly extending arm 7 has the finger 9 pivotally connected thereto at 10 and provided with a rearward projection 11 which is normally out of the path of the operating member 8 but is placed in the path of such operating member to initiate filling replenishment by the feeler. The finger 9 has a top portion 12 which overlies the horizontal arm 13 of a bell crank lever pivoted at 14 to a stand 15 secured to the loom frame at 16, and the downwardly extending arm 17 of the bell crank is connected to a transmitter 18 controlled by the feeler.

In the present instance the transmitter 18 is connected to a slide 19 through which the feeler extends, the construction being such that should the feeler move longitudinally along the filling carrier or bobbin on a detecting beat it will move the slide 19 and through the bell crank lever position the end 11 of the part 9 for engagement by the operating member 8 to call for a change of filling. The operating member 8 may be formed as a part of or secured to the usual cam follower.

Extending from the side of the loom frame is the shipper stand 20 to which is adjustably secured by a bolt 21 the feeler stand 22.

At its rear portion the feeler stand is provided with the guideway 23 in which the the slide 19 is movable and at the front of the feeler stand is a rocking bearing 24 which is secured to the feeler stand by a bracket 25 connected to the stand by a bolt 26.

The feeler 27, as hereinbefore stated, is of the inclined type and has a series of filling engaging teeth 28 on its rearwardly extending end. The frontwardly extending stem portion of the feeler passes through a slot in the slide 19 and through an opening in the swivel block 24, as indicated in Fig. 1, and between the front and rear bearings, the feeler has connected thereto a bridge piece 29 which, as shown, rests upon the top surface of the feeler stand. Between the bridge piece 29 and the swivel block 24 is a spring 30 which normally tends to move the feeler into its rearward feeling position.

The parts so far described are shown as of substantially the same construction as the similar parts in the prior patent to Edward S. Stimpson, No. 1,309,226, July 8, 1919, and while the present invention lends itself well to the control of such character of feeler mechanism, it is to be understood that feeler mechanisms of other types may be advantageously employed.

In accordance with the present invention the feeler is to have periods of activity and periods of inactivity during weaving with the same supply of filling in the shuttle, and in order that the feeler may not contact with the filling, even lightly, during its period of inactivity, the present invention contemplates that it be withdrawn in a direction away from its feeling position to assume its position of inactivity and be held in such position until released to its shorter period of activity. To this end the present invention provides a detent for engagement with a part connected to the feeler when the feeler is moved frontwardly by a working supply of filling in the shuttle on a detecting beat, and means are provided to move or withdraw the detent, and consequently the feeler, away from feeling position to assume its position of inactivity, for an interval of time, and then release the feeler to the performance of its feeling function.

The detent 31 is pivotally mounted at 32 to a detent carrier or arm 33 which is itself pivotally supported at 34 on a fixed part which may be conveniently formed as a bracket secured to the loom frame. In the present instance, the feeler stand 20 has secured to it by bolts 35, Figs. 2 and 3, a bracket 36 having a frontwardly extending arm 37 upon which is secured a similar bracket 38 by means of a bolt 39. The bracket 38 has a downwardly extending flange 40 in which is mounted the pivotal support or pin 34 for the detent support or arm 33, the construction being such that the detent support or arm 33 may be rocked about its pivotal support 34 towards and from the front of the loom, and be normally under the influence of a spring 41 tending to move the detent support or arm 33 towards the rear of the loom.

Figure 2:
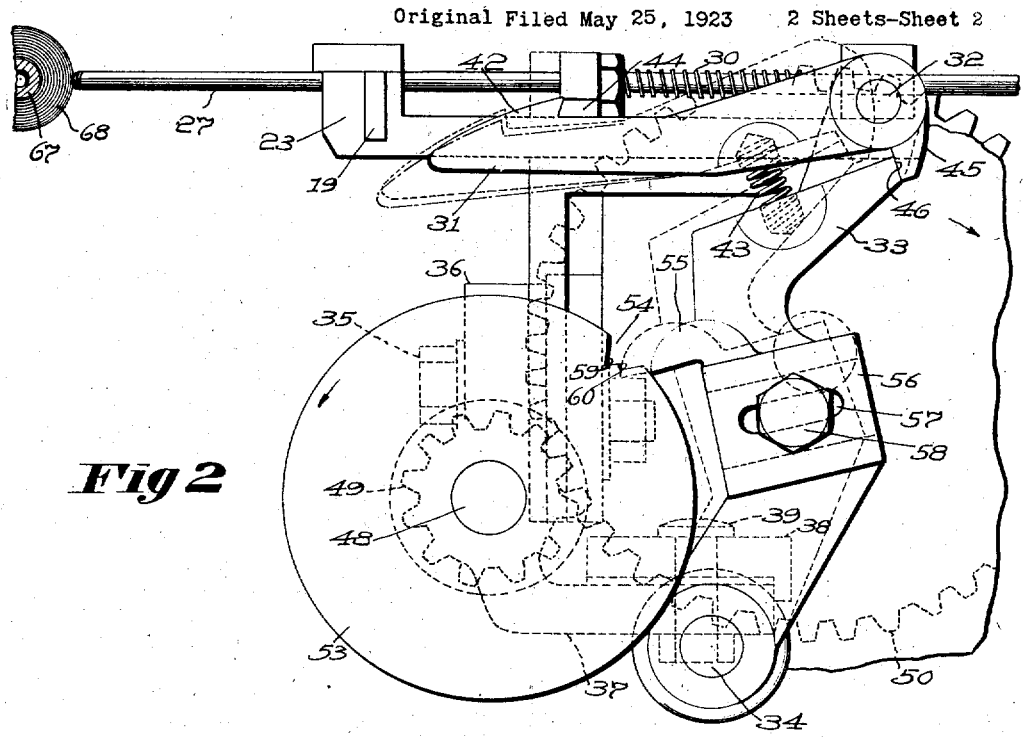
Fig. 2 is an enlarged side elevation of the feeler mechanism showing the relation of the parts when the feeler detects a working supply of filling in the shuttle on a detecting beat.
Figure 3:
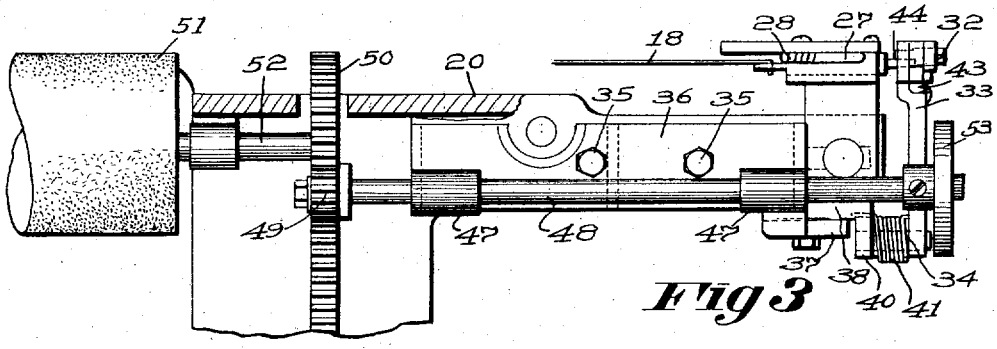
Fig. 3 is a rear elevation, with some of the parts broken away, showing certain operative connections for controlling the feeler.

The detent 31 has a tooth or upwardly projecting lug 42 and is normally under the influence of a spring 43 between the detent and the detent support or arm 33, Fig. 2, tending to move the tooth or lug 42 upwardly into the path of movement of the part carried by the feeler with which the detent is to be engaged. When the feeler is of the inclined type, such as herein described, the part connected to the feeler which is to be engaged by the detent may be one of the side projecting portions 44 of the bridge piece 29, but such part for engagement by the detent may be otherwise formed.

Projecting from the hub portion of the detent 31 is a finger 45 which by engagement with the stop 46 on the detent support or arm 33 limits the movement of the detent upwardly under the impulse of the spring 43.

The bracket 36 hereinbefore described as secured to the feeler stand is provided with bearings 47 in which is mounted the shaft 48 carrying a gear 49 which is in cooperative relation with or engaged by a toothed wheel or gear 50 connected to the sand or take-up roller 51. The toothed wheel or gear 50 may constitute a part of the take-up mechanism for rotating the sand or take-up roller 51 to take up the cloth as it is woven. The toothed wheel or gear 50 is shown as secured to the shaft 52 of the sand or take-up roller, but the take-up mechanism for rotating the toothed wheel or gear 50 to take up the cloth is not shown, because it may be of any usual or well-known construction.

The shaft 48 extends outwardly and has secured to its outer portion a detent controller 53 constructed and arranged to move the detent towards the front of the loom and the feeler away from feeling position when the part connected thereto is engaged by the detent, and to hold the feeler in its withdrawn position during its period of inactivity, and after the lapse of an interval cause the detent to free the feeler for a short period of activity.

In the present instance, the detent controller 53 is formed as a disc having the notched portion 54, and the detent carrier or arm 33 has adjustably mounted thereon the follower 55 which is adapted to ride over the peripheral portion of the detent controller and enter the notch when the latter is presented thereto. In the present instance of the invention the follower 55 is secured to or formed as part of a plate 56 having a slot 57 through which passes a bolt 58, the construction being such that the position of the follower 55 with respect to the detent controller may be varied to thereby alter the frontward or withdrawing movement of the detent.

The notched portion 54 of the detent controller 53 is formed with a deep portion 59 into which the follower 55 drops as the detent controller is slowly rotated, to thereby permit the detent 31 to drop into the dotted and dashed line position, Fig. 2, to disengage the part 44 of the feeler and permit the feeler to move to its active position. At the bottom of the notch 54 of the detent conroller is a small riser 60 over which the follower 55 rides as the detent controller is rotated, to thereby move the detent into the dotted line position, Fig. 2, with the tooth of the detent sufficiently high to engage the part 44 of the feeler when the latter is moved frontwardly by a working supply of filling in the shuttle on a detecting beat. As the follower moves over the wall 61 of the detent controller, the detent carrier or arm 33 is moved frontwardly to carry the detent and perforce the feeler engaged by it frontwardly or away from feeling position, and such withdrawn or inactive position of the feeler continues while the follower 55 of the detent carrier rides along the substantially circular portion of the detent controller.

Figure 4:
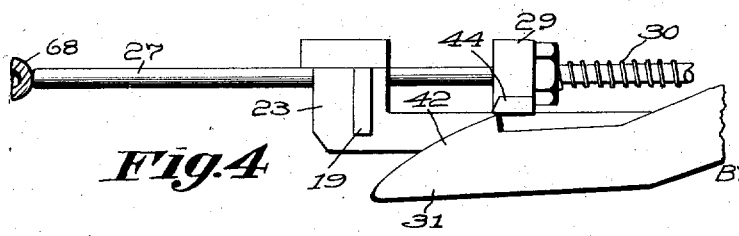
Fig. 4 is a detached detail with some of the parts broken away and omitted, showing the relation of parts when the feeler detects a near approach to but prior to the substantial exhaustion.

From the construction described as one good practical form of the present invention it will be apparent that the feeler will have short periods of activity and longer periods of inactivity as the detent controller 53 is actuated, and that the feeler will be moved away from its feeling position, or frontwardly, in the present instance, into its inactive position, so that during the period of inactivity of the feeler it will not engage the filling, even though a working supply of filling be present in the shuttle. As the detent controller 53 is slowly rotated and the notched portion 54 is brought opposite the follower 55, the latter will drop into the deep portion 59 of the notch 54 thereby permitting the detent to move rearwardly and downwardly into its inoperative position to release the feeler to the performance of its feeling function. As the detent controller 53 continues to rotate, the follower 55 will ride over the projections 60 in the notch 54 and position the detent for engagement with the part connected to the feeler should the latter be moved frontwardly by a working supply of filling in the shuttle, and as the follower 55 rides out of the notch 54 of the detent controller, the detent will be moved frontwardly to draw or move the feeler away from its feeling position and hold it in such position as the follower rides over the circular portion of the detent controller. Should the feeler, however, not be moved frontwardly by a working supply of filling in the shuttle on a detecting beat, when the detent has assumed its intermediate position, the part 44 of the feeler will not be moved frontwardly sufficiently far to engage the tooth of the detent, Fig. 4, and the feeler will remain active and call for a change of filling when that in the shuttle has become substantially exhausted.

The lay 62 may be of usual construction provided with a shuttle box 63, the front wall of which has an opening 64, which registers with a corresponding opening 65 in the shuttle when the latter is properly positioned in the shuttle box on a detecting beat. Likewise, the shuttle 66 may be of usual construction for supporting the filling carrier or bobbin 67 on which the filling 68 is wound.

No claim is made in this case for the dwell device for causing the detent or feeler engaging means to assume an intermediate position, but such subject-matter is claimed in the copending application, Serial No. 654,355, filed July 28, 1923, now Patent No. 1,507,124.

What is claimed is:

1. In a loom, the combination of a feeler to detect substantial exhaustion of the filling in the shuttle and thereupon initiate replenishment of filling, a feeler withdrawing and holding device to withdraw the feeler from cooperative relation with the filling and maintain it at rest, and means actuated from the take-up to operate said device to free the feeler at intervals during weaving with the same supply of filling in the shuttle that the feeler may have periods of activity and periods of inactivity with respect to the same filling in the shuttle.

2. In a feeler mechanism for looms, the combination of a feeler to detect substantial exhaustion of the filling in the shuttle and thereupon initiate replenishment of filling, a detent for determining the active and inactive condition of the feeler, and a detent controller to control movements of the detent into three positions, one to release the feeler, another to engage a part connected to the feeler, and another to move the feeler in a direction away from feeling position, and means actuated from the take-up for operating the detent controller.

3. In a feeler mechanism for looms, the combination of a feeler to detect substantial exhaustion of the filling in the shuttle and thereupon to initiate replenishment of filling, a detent for determining the active and inactive condition of the feeler, a detent carrier, and a detent controller actuated from the take-up and having a notched periphery along which the detent carrier rides to hold the feeler in a frontward and inoperative position for periods of inactivity and permit the feeler to move to feeling position at intervals.

4. In a feeler mechanism for looms, the combination of a feeler, a detent for determining the active and inactive periods of the feeler, a rotary detent controller, a detent carrier having a follower to engage the detent controller and determine the position of the detent, and means for adjusting the follower to determine the path of movement of the detent by the detent controller.

5. In a feeler mechanism for looms, the combination of a feeler, a detent for determining the active and inactive periods of the feeler, a rotary detent controller driven from the cloth take-up mechanism, a detent carrier having a follower to engage the detent controller and determine the position of the detent, and means for adjusting the follower to determine the path of movement of the detent by the detent controller.

6. In a feeler mechanism for looms, the combination of a feeler to detect substantial exhaustion of the filling in the shuttle and thereupon initiate replenishment of filling, a detent for determining the active and inactive periods of the feeler, a pivotally mounted detent carrier on which the detent is carried, a rotary detent controller having a notched periphery, and a follower on the detent carrier which engages the notched peripheral portion of the detent controller for holding the detent and follower in a frontward position for periods of inactivity of the feeler and releasing the feeler at intervals.

7. In a feeler mechanism for looms, the combination of a feeler to detect substantial exhaustion of the filling in the shuttle and thereupon initiate replenishment of filling, a detent carrier pivotally supported for swinging movement towards and from the front of the loom, a detent mounted on the carrier for movement therewith, and a detent controller acting through the detent carrier to move the detent rearwardly to disengage the feeler from the detent for periods of activity of the feeler, then to move the detent to an intermediate position to again engage the feeler and to then move the detent frontwardly.

8. In a feeler mechanism for looms, the combination of a feeler to detect substantial exhaustion of the filling in the shuttle and thereupon initiate replenishment of filling, a detent carrier pivotally supported for swinging movement towards and from the front of the loom, a detent mounted on the carrier for movement therewith, a detent controller acting through the detent carrier to move the detent rearwardly to disengage the feeler from the detent for periods of activity of the feeler, then to move the feeler to an intermediate position to again engage the feeler and to then move the detent frontwardly, a follower on the detent carrier for engagement with the detent controller, and means for adjusting the follower to determine the path of movement of the detent.

9. In a feeler mechanism for looms, the combination of a feeler having periods of activity and inactivity with the same supply of filling in the shuttle, a detent for holding the feeler in a frontward position beyond the reach of the filling during its periods of inactivity and releasing it at intervals, a detent controller formed as a disc having a notch, a detent carrier having a follower held in engagement with the disc for moving the detent to a rearward feeler releasing position and then to a feeler engaging position and then to a frontward position.

In testimony whereof I have signed my name to this specification.

ALONZO E. RHOADES.